United States Patent [19]

Shirato et al.

[11] 4,392,907

[45] Jul. 12, 1983

[54] METHOD FOR PRODUCING RECORDING HEAD

[75] Inventors: Yoshiaki Shirato, Yokohama; Yasushi Takatori, Sagamihara; Toshitami Hara, Tokyo; Yukuo Nishimura, Sagamihara; Michiko Takahashi, Higashi Ohizumi, all of Japan

[73] Assignee: Canon Kabushiki Kaisha, Tokyo, Japan

[21] Appl. No.: 309,411

[22] Filed: Oct. 7, 1981

Related U.S. Application Data

[63] Continuation of Ser. No. 133,317, Mar. 24, 1980, abandoned.

[30] Foreign Application Priority Data

| | | | |
|---|---|---|---|
| Mar. 27, 1979 | [JP] | Japan | 54-36040 |
| Mar. 27, 1979 | [JP] | Japan | 54-36042 |
| Mar. 29, 1979 | [JP] | Japan | 54-37385 |
| Mar. 29, 1979 | [JP] | Japan | 54-37389 |

[51] Int. Cl.³ ...................... B32B 31/18; G01D 15/16

[52] U.S. Cl. .................................... 156/252; 156/257; 346/140 R

[58] Field of Search ............... 156/210, 252, 257, 277, 156/320, 321, 290, 292; 346/140 R, 140 PD

[56] References Cited

U.S. PATENT DOCUMENTS

| | | | |
|---|---|---|---|
| 3,539,429 | 11/1970 | Kilduff et al. | 156/292 |
| 4,032,929 | 6/1977 | Fischbeck et al. | 346/140 R |
| 4,115,789 | 9/1978 | Fischbeck | 346/140 R |
| 4,229,751 | 10/1980 | Tamai | 346/140 PD |
| 4,243,994 | 1/1981 | Kobayashi et al. | 346/140 R |
| 4,251,824 | 2/1981 | Hara et al. | 346/140 R |
| 4,296,421 | 10/1981 | Hara et al. | 346/140 R |
| 4,313,684 | 2/1982 | Tazaki et al. | 346/140 R |
| 4,317,124 | 2/1982 | Shirato et al. | 346/140 R |
| 4,323,908 | 4/1982 | Lee et al. | 346/140 PD |
| 4,330,787 | 5/1982 | Sato et al. | 346/140 R |
| 4,334,234 | 6/1982 | Shirato et al. | 346/140 R |
| 4,335,389 | 6/1982 | Shirato et al. | 346/140 R |
| 4,336,548 | 6/1982 | Matsumoto | 346/140 R |
| 4,337,467 | 6/1982 | Yano | 346/140 R |
| 4,339,762 | 7/1982 | Shirato et al. | 346/140 R |
| 4,343,968 | 8/1982 | Toyomura | 178/23 R |
| 4,345,262 | 8/1982 | Shirato et al. | 346/140 R |

FOREIGN PATENT DOCUMENTS

| | | | |
|---|---|---|---|
| 55-118874 | 9/1980 | Japan | 346/140 PD |
| 55-118875 | 9/1980 | Japan | 346/140 PD |

*Primary Examiner*—Caleb Weston

*Attorney, Agent, or Firm*—Fitzpatrick, Cella, Harper & Scinto

[57] ABSTRACT

A method for producing a recording head for ejecting a recording liquid in an action chamber from an orifice connected with said action chamber in a state of small droplets and depositing at least a part of said droplets onto a recording surface to achieve recording, said method comprising a step X of forming a member a provided with a perforation for constituting said action chamber, a step Y of adjoining an end aperture of said perforation to another member b constituting an intermediate supply chamber of said liquid, and a step Z of attaching to said member c another member c for forming a slit in the vicinity of the other end aperture of said perforation.

17 Claims, 20 Drawing Figures

METHOD FOR PRODUCING RECORDING HEAD

This application is a continuation of U.S. Patent Application Ser. No. 133,317, filed Mar. 24, 1980, now abandoned.

BACKGROUND OF THE INVENTION

1. Field of the Invention

The present invention relates to a method for producing a non-impact recording apparatus, and more particularly to a method for producing a recording head adapted for use in an ink jet recording apparatus in which a recording liquid, generally called ink, is ejected in a state of minute droplets from a small orifice and deposited on a recording surface to achieve recording.

2. Description of the Prior Art

Among non-impact recording processes, the ink jet recording has been actively developed in recent years because of various advantages such as very low noise level at the recording, possibility of high-speed recording, possibility of recording on plain paper without particular fixing treatment.

In said ink jet recording process there is employed an emission recording liquid which is generally called ink. Also for conducting said process there is required a recording head which has an emission orifice for ejecting said recording liquid in a state of droplet and causing the flight of such droplet, and an inlet for introducing said recording liquid, and which can be realized in various structures according to the principles of droplet ejection.

As an example there is already known a recording head in which ink is supplied from an external ink supply tank to a nozzle-shaped liquid chamber under such a pressure as not to cause ink ejection from the orifice, and a voltage is applied across the ink in said liquid chamber and an electrode provided in front of the orifice to cause electrostatic ejection of the ink from the orifice.

Such recording head, though simple in structure, is defective in that it requires a complex constitution in the entire system and necessitates highly advanced precise electric control on the generation of droplets and flight direction thereof. In addition it is difficult to obtain a high-speed recording apparatus as a multiple head with high-density arrangement, which is indispensable for high-speed recording.

In this manner, most of the known recording heads are associated with unsolved problems in terms of structure, production method, achieving high-speed recording and/or composition of the entire system.

In addition the various component parts of such recording head are to be of uniform quality, and it is in fact not easy to produce such component parts with a satisfactory yield.

Such technical difficulties in production are aggravated in case of recording heads structured as a multiple head array in which each component part is smaller and requires increased precision.

SUMMARY OF THE INVENTION

In consideration of the foregoing, the principal object of the present invention is to provide a method for producing an ink jet recording head resolving the aforementioned technical problems, and more specifically a method for producing an ink jet recording head through a process which is simple but ensures high precision.

Another object of the present invention is to provide a method for mass production, with an improved yield, of an ink jet recording head allowing high-speed and high-quality recording.

Still another object of the present invention is to provide a practical method for producing a multiple-orifice recording head having plural small orifices of uniform diameter and shape.

According to the present invention, there is provided a method for producing a recording head for ejecting a recording liquid in an action chamber from an orifice connected with said action chamber in a state of small droplets and depositing at least a part of said droplets onto a recording surface to achieve recording, said method comprising a step X of forming a member a provided with a perforation for constituting said action chamber, a step Y of adjoining an end aperture of said perforation to another member b constituting an intermediate supply chamber of said liquid, and a step Z of attaching to said member c another member c for forming a slit in the vicinity of the other end aperture of said perforation.

DETAILED DESCRIPTION OF THE PREFERRED EMBODIMENTS

Now the present invention will be clarified in detail by the following description to be taken in conjunction with the attached drawings.

Figure 1:
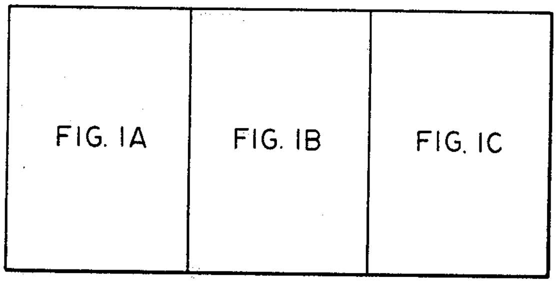
FIGS. 1A, 1B and 1C, when combined as shown in FIG. 1, are step flow charts of the recording head assembly process embodying the present invention.

At first there will be given an explanation on an example of a process for assembling a multiple-head array, making particular reference to the step flow chart shown in FIG. 1.

Figure 1A:
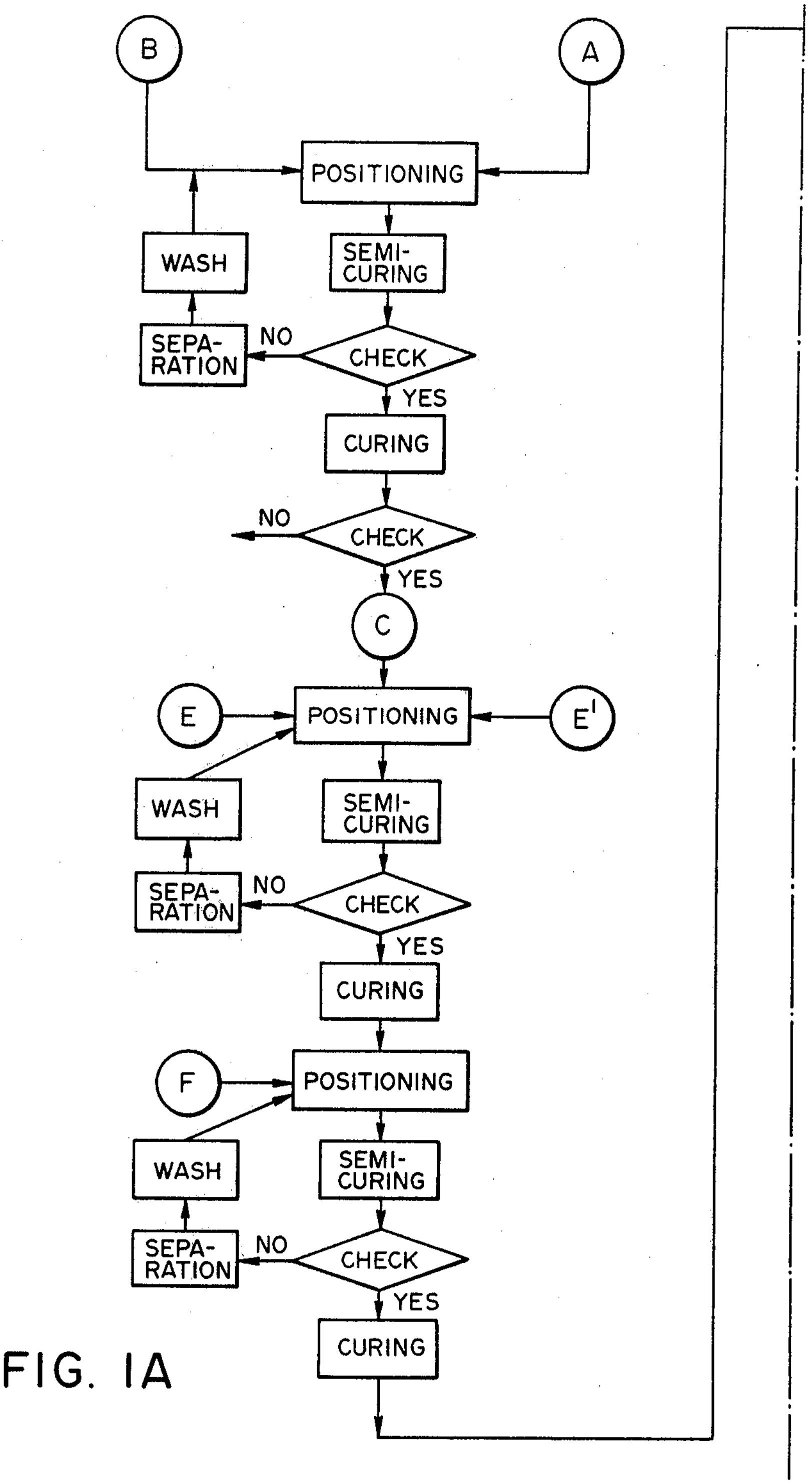
Figure 1B:
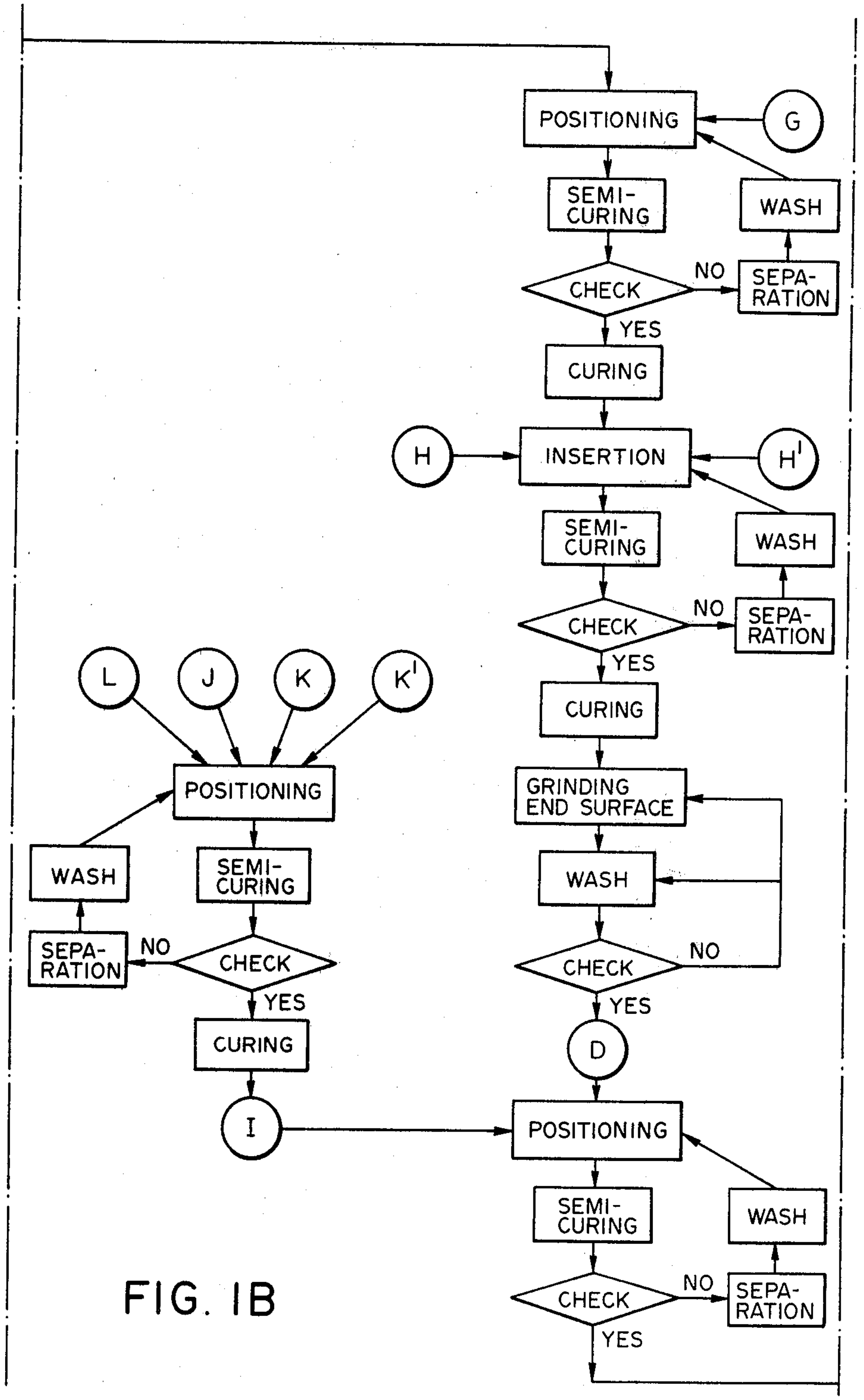
Figure 1C:
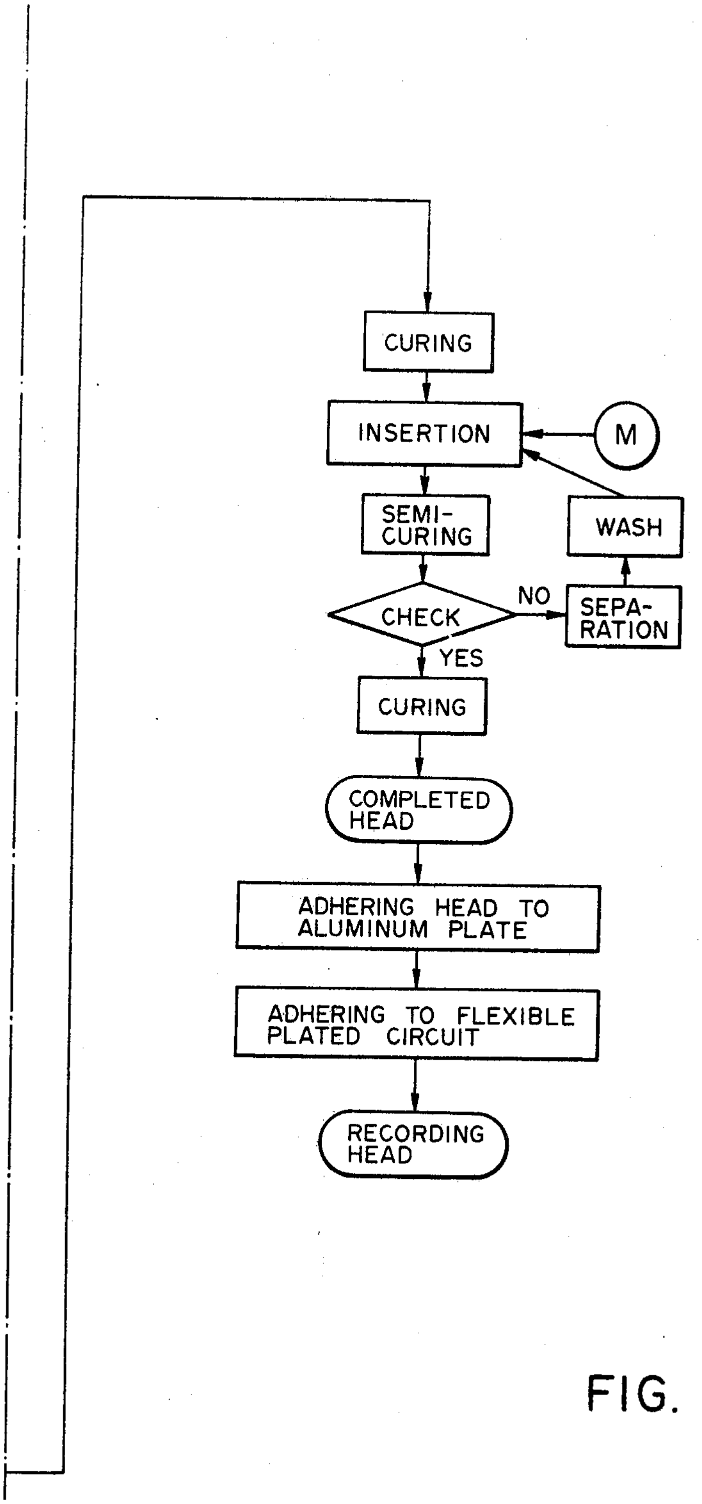

In FIG. 1A, reference marks A and B represent component parts for constituting the action chamber portion of the recording head.

Figure 2:
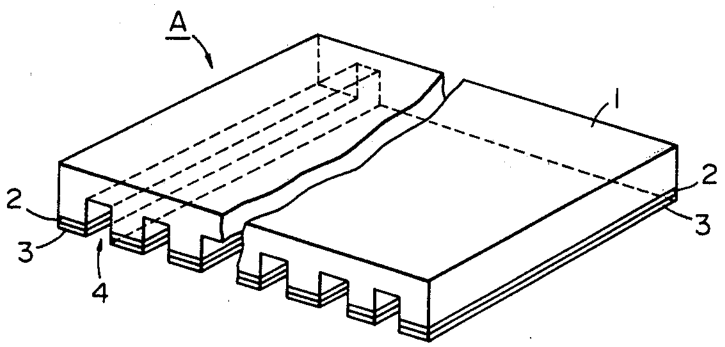
FIGS. 2 to 7 are schematic views of the recording head in various stages of said process.

Said part A, shown in FIG. 2, is obtained from a flat plate 1 composed for example of glass, quartz, ceramics, plastics, metal etc. in the following manner.

After washing, said flat plate 1 is coated on one side thereof with an anchor layer 2 principally composed of an epoxy resin, then baked for 20 minutes at 100° C. and further coated, on said anchor layer 2, with an adhesive layer 3 for example of the following composition, in a thickness of ca. 0.5 to 10 $\mu$m, preferably ca. 1 to 5 $\mu$m:

Epicote #1007 (trade name): 100 pts. by weight
aromatic amine curing agent: 5 pts. by weight
silane coupling agent: 5 pts. by weight
methylethyl ketone: 300 pts. by weight After said adhesive is semi-cured by preliminary drying for 5 minutes at 100° C., elongated grooves 4 of determined number are formed on thus coated surface with a diamond blade cutter, for example Disco 2H/5 (trade name) of Disco Corp. Thereafter the flat plate is cut into determined dimension to obtain the part A.

In general, said grooves 4 have a cross section within a range of 10×10 μm to 150×150 μm and are arranged with a pitch within a range of 30 to 200 μm. Also the adhesive is not limited to the above-mentioned composition but includes other adhesives capable of adhesion under heating. Such adhesives include organic compound adhesives such as epoxy resin adhesives, phenolic resin adhesives, urethane resin adhesives, silicone resin adhesives, triazine resins or BT resins, and inorganic compounds such as molten silver salts as disclosed in the U.S. Patent No. 3,089,799 or low-melting glasses. Such inorganic compounds are often used in powder state rather than in liquid state.

Figure 3:
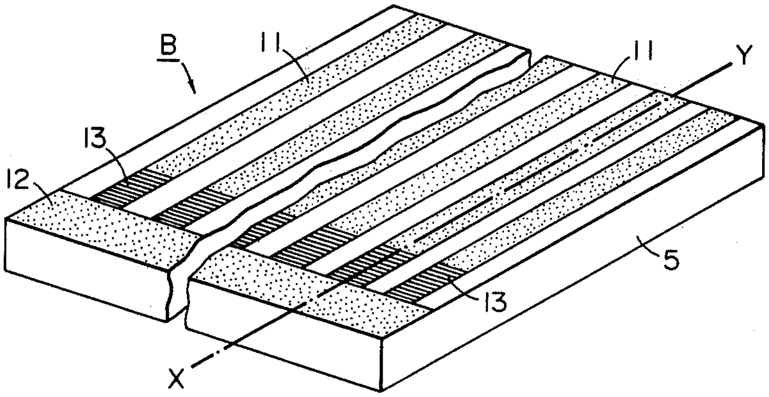
Figure 4:
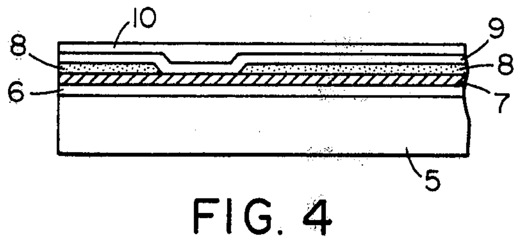

Separately there is prepared another component part B shown in FIG. 3. As illustrated in FIG. 4 showing a cross section along the line X-Y in FIG. 3, the part B is obtained by forming, on one surface of a substrate 5 (thickness ca. 0.6 mm) of alumina, monocrystalline silicon, or metal such as aluminum, iron and the like, a heat accumulating layer 6 ($SiO_2$ sputtered layer of 2–3 μm), a heat-generating resistor layer 7 ($H_fB_2$ sputtered layer of 500–1000 A), an electrode layer 8 (aluminum evapor-deposited layer of 700–800 A), a protective layer 9 ($SiO_2$ sputtered layer of 1 μm) and a filling layer 10 (a sputtered layer of Parylen, silicone or $Ta_2O_3$) in succession and cutting said substrate into desired dimension.

In the above-mentioned procedure the electrode layer 8 is subjected to a pattern etching step to form individual lead electrodes 11 and a common lead electrode 12 as shown in FIG. 3 and to expose said resistor layer 7 in a desired pattern 13 of a determined number. Said resistor pattern 13 is preferably of a dimension approximately equal to the width of said grooves 4.

The protective layer 9 and filling layer 10 shown in FIG. 4 may be dispensed with in certain cases.

Figure 5:
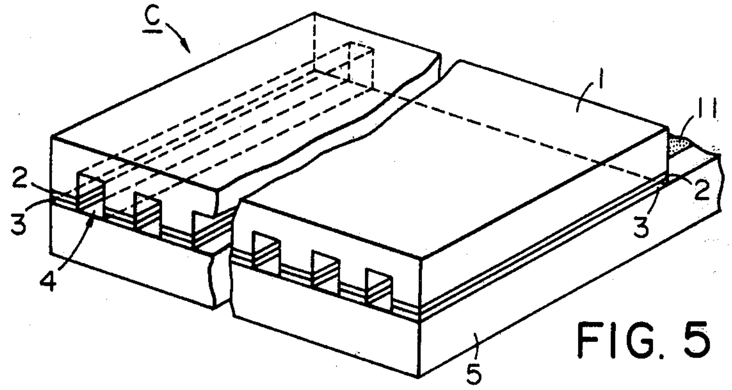

The parts A and B thus prepared are mutually positioned in such a manner that the grooves 4 and resistor patterns 13 are in a mutually corresponding relation, and are maintained in this position as shown in FIG. 5.

Successively the adhesive layer 3 is further semi-cured by heating for 10 minutes at ca. 100° C., and a check step is conducted for confirming the absence of positional aberration or clogging of grooves 4. If the result is negative (case NO), the parts A and B are separated and the part B is washed for reuse while the part A is discarded. In the absence of defect (case YES) the adhesive layer 3 is fully cured by heating for 50 minutes at 100° C. and 2 hours at 180° C. Thereafter a check step is conducted again for confirming the absence of clogging in the grooves 4, and in the absence of defect the completed action chamber block C is forwarded to the subsequent process.

In the present invention, in which plural components are mutually adhered with a curable resin to obtain a determined structure, particularly advantageous is the use of the above-explained adhering process comprising the step of forming a curable resin layer on at least one of said components and bringing said resin layer to an intermediate state of the curing reaction, the step of forming groove patterns on a face of said component having said resin layer, and the step of adhering plural components by curing said resin layer.

In this manner it is rendered possible to combine the components without causing damage to minute groove patterns by semi-curing a curable resin layer provided on a component on which said groove patterns are to be formed, then forming said groove patterns on said component having thus semi-cured resin layer and finally curing said resin layer after said component is combined with another component.

Particularly in the preparation of a recording head of the type causing ejection of recording liquid in a state of droplet from an orifice, the above-explained process allows production of multiple orifices of uniform diameter and form arranged with a high density.

This adhering method will be further clarified in the following.

FIG. 8 shows the steps of adhering a face of a substrate, having minute groove patterns, to another component.

Figure 8A:
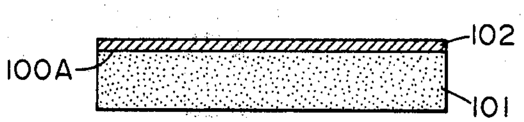
FIGS. 8A, 8B, 8C and 9 are partial views of the recording head showing the adhesion method of the present invention.

In a first step shown in FIG. 8A, a curable resin layer 102 is formed on a face 100A of a substrate 101 and is brought to a semi-cured state. In the field of thermocurable resins, said semi-cured state is called "B-stage" which is an intermediate state in the thermosetting reaction and in which the resin shows temporary softening upon heating or swelling in contact with certain liquids or solvents but does not show complete dissolution or melting ("Setchaku Binran" (Adhesion Manual), Setchaku Kenkyukai and Kobunshi Kankokai). In this state the thermocurable resin no longer shows fluidity or stickiness in the uncured state.

Also in case of a photocurable resin, it is possible to realize a state similar to said B-stage by suitable selection of the amount of light exposure and curing agent.

Figure 8B:
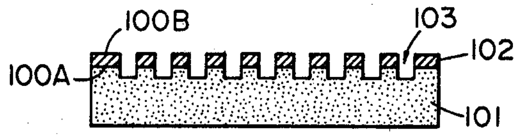

In the succeeding step shown in FIG. 8B, minute patterns 103 are formed for example by mechanical working or laser beam working on a surface 100B of the resin layer in said B-stage state. The thickness of said resin layer, though dependent on the precision required for the formed patterns, should be as thin as possible within the extent of providing a sufficient adhesion strength. In a representative example of forming three-dimensional patterns of 10 to 100 μm, the thickness of the curable resin layer 102 is selected within a range of 0.5 to 10 μm, preferably 1 to 5 μm.

Figure 8C:
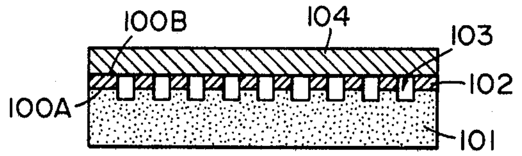

In the step shown in FIG. 8C, the substrate 101 having micropatterns thus formed is integrally adhered, on the face 103 of said patterns, with another component 104. In this step the curable resin in the aforementioned B-stage state is brought to a fully cured state by heating at a high temperature or by high-energy light irradiation.

The process comprising the above-explained steps is advantageous in that the adhesive can be given only to the desired places with easily controlled amount, and in the easier positioning of the components at the adhering step.

Figure 9:
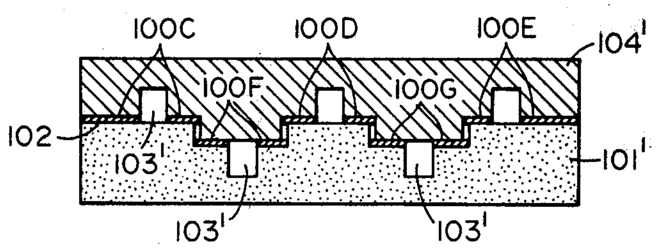

Although the components are assumed to be of plate-shaped in FIGS. 8A to 8C, the advantages of the above-explained adhesion process become even more prominent as the formed patterns and the places for adhesion become finer and more complex. FIG. 9 shows another example in which the patterns and the adhering places are sterically distributed in a complex manner on a component 101′ and another component 104′.

In the illustrated example a resin layer 102 is provided on the faces 100C, 100D and 100E of the component 104′ and on the faces 100F and 100G of the component 101′, and groove patterns 103′ are formed on said resin layer 102 after it is brought to the aforementioned B-stage state. The final structure with desired patterns is obtained by fitting the components 101' and 104' in determined relation and fully curing the resin layer 102.

The component 104' or 101' is not limited to the plate shape as shown in FIG. 8 or 9 but may have a sterically structured shape.

The resin to be employed for forming said resin layer 102 may be any thermocurable or photocurable resin capable of assuming said B-stage state. Examples of such thermocurable resin include phenolic resins, resorcinol resins, urea resins, ethylene-urea resins, melamine resins, benzoguanamine resins, furane resins, xylene resins, BT resins formed by addition polymerization of triazine resins and bismaleimide, epoxy resins, unsaturated polyesters, polyurethanes, silicone resins, polydiallylphthalate, or cocondensates or modified resins thereof.

Also there may be employed a compound adhesive composed principally of a thermocurable resin added with a small amount of a thermoplastic resin or an inorganic additive such as zinc oxide, titanium oxide, mica or glass fiber for the purpose of improving the impact strength, bending property, dimensional stability etc. of said thermocurable resin. The examples of the resins for such compound adhesive include urea-polyvinyl acetate, urea-polyvinyl alcohol, phenolic resin-polyvinyl acetate, phenolic resin-polyvinyl formal, phenolic resin-polyvinylbutyral, phenolic resin-nitrile rubber, phenolic resin-chloroprene rubber, phenolic resin-nylon, melamine resin-acrylic resin, melamine resin-polyvinyl acetate, melamine resin-alkyd resin, epoxy resin-nylon, epoxy resin-polyamide, epoxy resin-acrylic resin, epoxy resin-synthetic rubber, epoxy resin-polysulfide synthetic rubber epoxy resin-polyisocyanate, epoxy resin-xylene resin and epoxy resin-phenolic resin. Also the examples of photocurable resins include a mixture of a unsaturated polyester resin and a monomer, dimer or oligomer having at least one unsaturated double bond in a molecule such as methyl metacrylate, styrene or diallylphthalate, or a mixture of an unsaturated polyester and a resin such as silicone, urethane or epoxy resin modified so as to have at least one unsaturated double bond as the terminal radial or in the main molecular chain, eventually added with aforementioned monomer, dimer or oligomer.

These resins can be cured by ultraviolet, visible light or infrared irradiation, preferably by ultraviolet or visible light.

These resins are suitably selected and used usually with suitable curing agents in consideration of the resistance against the recording liquid to be used and the steps of the head preparation.

Figure 10A:
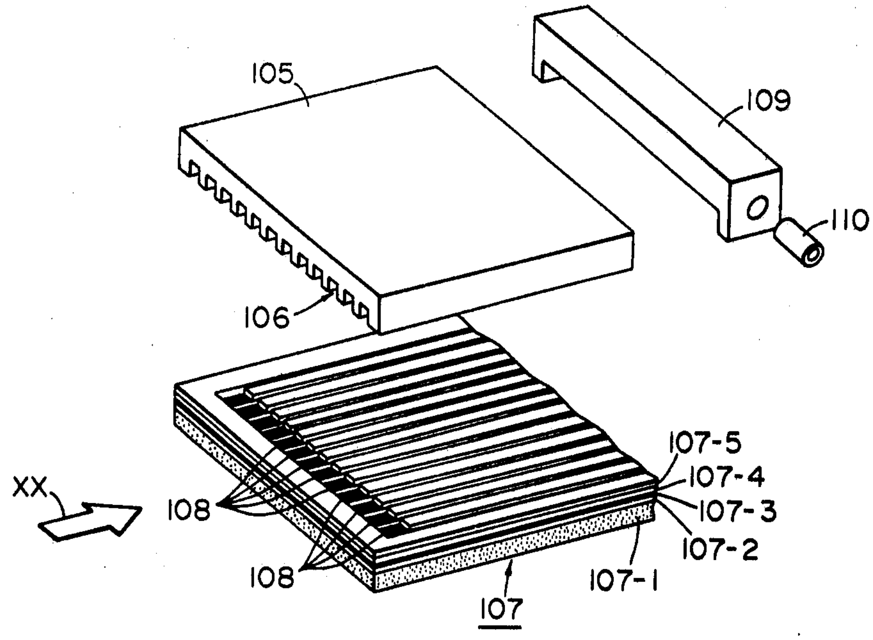
FIGS. 10A and 10B are schematic views showing another embodiment of the present invention.
Figure 10B:
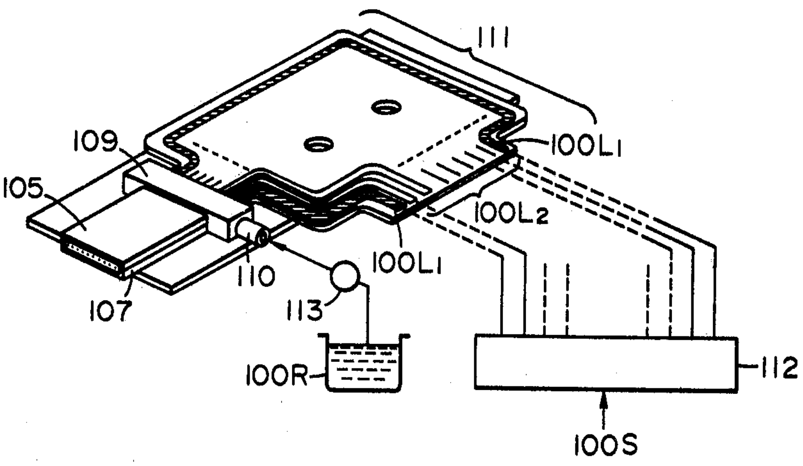

In the following briefly explained, by FIGS. 10A and 10B, is a preferred embodiment of the preparation of recording head utilizing the above-explained adhesion process.

Said recording head is basically composed of a grooved plate 105 having a plurality of grooves 106 for respectively constituting liquid chambers and a substrate 107 with heating elements to be adhered to said grooved plate, to which mounted are a block 109 for forming a common chamber, a pipe 110 for introducing recording liquid from a reserve tank. In this manner droplet ejecting orifices are formed on an end face of the grooved plate 105 and said substrate 107 facing the arrow XX. In said block 109 there is formed a pattern constituting a common chamber for ensuring smooth supply of the recording liquid, and the adhesion process explained in relation to FIGS. 8A, 8B, 8C and 9 is naturally applicable also in the formation of said common chamber.

On said substrate 107 there are provided thermal energy generating means, for example electrothermal transducers, for supplying energy for causing the ejection of the recording liquid. Said transducers are of a multilayered structure provided on a heat conductive substrate 107-1 for example of a metal or alumina and composed of a heat accumulating layer 107-2, a heat-generating resistor layer 107-3, an electrode layer 107-4 and a protective layer 107-5, wherein said resistor layer 107-3 and electrode layer 107-4 are formed by etching process into divided structures of a pitch identical with that of the grooves 106 on said plate 105.

In addition there are provided a lead plate 111 having lead terminals 100L1, 100L2 connected with said electrodes 107-4 for supplying electric signals to said electrothermal transducers 108, signal processing means 112, for example a pulse converter for processing a signal 100S, and a supply pipe 110 for supplying the recording liquid to the recording head from a reserve tank 100R and optionally containing intermediate process means 113 such as pump, filter etc. to complete the recording system. Also it is to be noted that the electrothermal transducers may be eliminated from the substrate 107 in case the thermal energy is supplied by an electromagnetic wave such as laser beam which can be obtained from selective irradiating means positioned outside the liquid chambers.

The aforementioned adhesion process is applicable not only to the preparation of the recording head causing liquid ejection by the thermal energy but also to the preparation of the recording head causing liquid ejection by mechanical vibration of a piezoelectric element or a similar head in which liquid droplets generated by continuous vibration method are charged according to the recording signals and made to fly between deflecting electrodes.

The foregoing adhesion process will be further clarified by the following examples:

EXAMPLE 1

A sodium glass plate of a thickness of 950μ was sufficiently washed, and coated with an adhesive of the following composition with a spinner to obtain an adhesive layer 102 shown in FIG. 8A:

epoxy resin (Epikote #828, Shell Oil): 100 pts. by weight
p-diaminodiphenylmethane: 28.5 pts. by weight
methylethyl ketone: 150 pts. by weight
toluene: 150 pts. by weight Said adhesive layer 102 was let to stand at room temperature for a while, and heated then for 20 minutes in an oven of 100° C. to obtain a semi-cured B-stage state, with a thickness of 5μ after drying.

Subsequently groove patterns 103 (cf. FIG. 8B) of 30μ in width and 25μ in depth were formed with a pitch of 60μ by means of a rotary diamond cutter to obtain a grooved plate 105.

Separately electrothermal transducers having heat generating elements of 30μ in width, 100μ in length and 60μ in pitch as shown in FIG. 10A were formed on an alumina substrate to obtain a substrate 107. Then said grooved plate 105 and substrate 107 were mutually positioned in such a manner that the grooves 106 of said plate 105 respectively correspond to the electrothermal transducers 108 on the substrate 107.

Thereafter the combined structure was heated for 3 hours in an oven of 180° C. to fully cure the adhesive layer 102. A recording head as shown in FIG. 10B was obtained by connecting block 109, pipe 110 and lead plate 111.

The recording head thus obtained was used in recording on a recording paper with drive pulses of a width of 10 $\mu$sec and a frequency of 10 KHz to obtain satisfactory result.

A microscopic observation revealed uniform adhesion without intrusion of the adhesive into the liquid chambers.

EXAMPLE 2

The process of the Example 1 was reproduced except that p-diaminodiphenylmethane was replaced by the following materials to obtain similarly satisfactory results. Following Table 1 also shows the heating conditions for achieving the B-stage state in the resin layer 102 and those for final curing.

TABLE 1

| | Pts. by weight | Preliminary heating | Curing heating |
|---|---|---|---|
| m-phenylene diamine | 15 | 100° C./15 min. | 150° C./6 hrs. |
| diaminodiphenyl-sulfone | 30 | 120° C./30 min. | 200° C./3 hrs. |
| dicyandiamide | 8 | 100° C./30 min. | 170° C./3 hrs. |
| borontrifluoride-monoethylamine | 5 | 100° C./20 min. | 200° C./4 hrs. |

EXAMPLE 3

The process of the Example 1 was reproduced except that the resin therein was replaced by the following composition shown in FIG. 2. The obtained recording head showed sufficient adhesion strength without any flow of the resin into the liquid chambers and provided satisfactory recorded image.

TABLE 2

| | pts. by weight | preliminary heating | curing heating |
|---|---|---|---|
| Epikote #1007 | 100 | | |
| p-diaminodiphenyl-methane | 3 | 100° C./7 min. | 180° C./4 hrs. |
| methylethyl ketone | 150 | | |
| toluene | 150 | | |

Now there will be given additional explanation on the protective layer 9 and filling layer 10 shown in FIG. 4. Said layers are provided for preventing the direct contact of the heating resistor 7 or the electrode 8 with the recording liquid or ink, leading to the oxidation of such resistor or electrode, or the decomposition of the ink. In the recording head of the present invention, the thickness of protective layer 9 and filling layer 10 has a significant influence on the thermal response of droplet ejection and on the efficiency of recording energy since the thermal energy generated by the resistor 7 is transmitted through said layers. Stated differently, in such embodiment, the thinner are the protective layer 9 and filling layer 10, the better is thermal response and lesser required is the printing energy because of improved thermal conduction. However, a protective layer formed by vacuum evaporation or sputtering as has conventionally been employed in the preparation of the thermal recording heads tends to leave an uncovered portion at the shoulder between the electrode 8 and resistor 7 or cause pinholes in said layer itself when the thickness of such layer is reduced. For this reason it has been considered necessary to maintain such a thickness as not to cause exposure of the electrode 8 or resistor 7 even at the sacrifice of the thermal conductivity.

The present inventors have however found a measure for completely preventing the electrode 8 or resistor 7 from contacting or causing reaction with the ink even with an extremely thin protective layer.

More specifically, according to the present invention, after the electrode 8 and resistor 7 are formed into desired patterns, there is deposited a first protective layer 9 in a thickness of 0.01 to 1 $\mu$m by electron beam evaporation or sputtering of an oxide such as beryllium oxide, silicon oxide, magnesium oxide, aluminum oxide, tantalum oxide or zirconium oxide; a carbide such as beryllium carbide; a nitride such as a tantalum nitride, aluminum nitride or boron nitride; a boride such as beryllium boride; or a sulfide such as lanthanum sulfide, praseodymium sulfide, neodym sulfide or ytterbium sulfide.

Said first protective layer 9 may also be obtained by spray coating, spinner coating or dip coating in a thickness of 0.01 to 1 $\mu$m of a heat-resistant resin such as silicone resins, fluorinated resins, aromatic polyamides, addition-polymerized polyimides, polybenzimidazole, metal chelate polymers, titanic acid esters, epoxy resins, phthalic resins, thermosetting phenolic resins, p-vinylphenolic resins, triazine resins, BT resins (addition polymerization resins of triazine resins and bismaleimide) etc.

Naturally said first protective layer 9 is not limited to a single-layer structure but may be composed of plural layers. The presence of pinholes in such protective layer 9 has not been a major problem in the thermal recording heads utilized for thermal recording. However, in case of the ink jet recording in which the protective layer comes into direct contact with the liquid, the prevention of pinholes in the first protective layer 9 becomes a major issue in relation to the service life of the recording apparatus.

According to the present invention, the defects, such as pinholes, present in said first protective layer 9 are almost completely filled by a second protective layer (or filling layer) 10 overlaid on said first protective layer 9. Thus said second protective layer functions as a filling layer for the first protective layer 9. The resin for forming said filling layer 10 of the present invention is preferably provided with the properties of (1) satisfactory film formation, (2) dense structure with little pinhole formation, (3) absence of swelling by or dissolution in the ink used, (4) satisfactory adhesion to the first protective layer, and (5) high thermal resistance. Examples of preferred resin are silicone resins, fluorinated resins, aromatic polyamides, addition-polymerization type polyimides, polybenzimidazole, metal chelate polymers, titanic acid esters, epoxy resins, phthalic resins, thermosetting phenolic resins, p-vinylphenolic resins, triazine resins and BT resins (addition polymerization resins of triazine resins and bismaleimide).

Another preferred method is the film formation by evaporation of polyxylylene resins or derivatives thereof.

It is also possible to form a layer on the first protective layer by plasma polymerization of various organic monomers, such as thiourea, thioacetamide, vinylferrocene, 1,3,5-trichlorobenzene, chlorobenzene, styrene, ferrocene, picoline, naphthalene, pentamethylbenzene, nitrotoluene, acrylonitirle, diphenyl selenide, p-toluidine, p-xylene, N,N-dimethyl-p-toluidine, toluene, aniline, diphenyl mercury, hexamethylbenzene, malononitrile, tetracyanoethylene, thiophene, benzene selenol, tetrafluoroethylene, ethylene, N-nitrosodiphenyl amine, acetylene, 1,2,4-trichlorobenzen or propane. In case of the above-mentioned heat-resistant resins, said filling layer 10 can be obtained by dissolving such resin in a solvent, and applying the thus obtained solution by spinner coating, spray coating or dipcoating on the first protective layer 9 followed by drying.

Said filling layer 10 should be as thin as possible since it directly influences the thermal response of droplet ejection or the energy efficiency. According to the present invention, the thickness after drying is selected within a range of 0.01 to 10 μm, preferably 0.1 to 5 μm and most preferably 0.1 to 3 μm.

In case the recording head is used in combination with an electroconductive ink utilizing water as the solvent, the first protective layer 9 and/or filling layer 10 are preferably formed in a thickness of ca. 0.1 to 5 μm to obtain a specific resistivity of $5\times10^5$ Ωcm or larger, in order to prevent shortcircuiting through the ink.

As already mentioned in the foregoing, said protective layers are preferably made thinner in order to improve thermal response of droplet ejection or energy efficiency. In consideration of this fact and also of the required insulation there is further preferred a thickness in a range of 0.2 to 3 μm.

In the present invention such insulating protective layer is formed by a known method. Examples of the material for such layer are transition metal oxides such as titanium oxide, vanadium oxide, niobium oxide, molybdenum oxide, tantalum oxide, tungsten oxide, chromium oxide, zirconium oxide, hafnium oxide, lanthanum oxide, yttrium oxide or manganese oxide; metal oxides such as aluminum oxide, calcium oxide, strontinum oxide, barium oxide or silicon oxide; mixtures of such oxides; high-resistance nitrides such as silicon nitride, aluminum nitride, boron nitride or tantalum nitride; mixtures of such oxides and nitrides; and semiconductive materials such as amorphous silicon or amorphous selenium; which show a high resistance in the film formation by sputtering, CVD method, evaporation, gaseous reaction or liquid coating even if they are of low resistance in the bulk state. The thickness of said film is generally in a range of 0.1 to 5 μm, preferably 0.2 to 3 μm.

The protective layer 9 may also be composed of a resin showing the properties of (1) satisfactory film formation, (2) dense structure with little pinhole formation, (3) absence of swelling by or dissolution in the ink used, (4) satisfactory insulation in the film state, and (5) high thermal resistance, such as silicone resins, fluorinated resins, aromatic polyamides, addition polymerization type polyimides, polybenzimidazole, metal chelate polymers, titanic acid esters, epoxy resins, phthalic resins, thermosetting phenolic resins, p-vinylphenolic resins, triazine resins and BT resins (addition polymerization resins of triazine resins and bismaleimide). It is further possible to obtain said layer by evaporation of polyxylylene resins or derivatives thereof.

Furthermore, said protective layer can be obtained by film formation by plasma polymerization of various organic monomers such as thiourea, thioacetamide, vinylferrocene, 1,3,5-trichlorobenzene, chlorobenzene, styrene, ferrocene, picoline, naphthalene, pentamethylbenzene, nitrotoluene, acrylonitrile, diphenyl selenide, p-toluidine, p-xylene, N,N-dimethyl-p-toluidine, toluene, aniline, diphenyl mercury, hexamethylbenzene, malononitrile, tetracyanoethylene, thiophene, benzene selenol, tetrafluorethylene, ethylene, N-nitrosodiphenyl amine, acetylene, 1,2,4-trichlorobenzene or propane.

The effect of the above-explained protective layers will be further clarified from the following experimental examples.

EXPERIMENTAL EXAMPLES 1–9

Figure 11A:
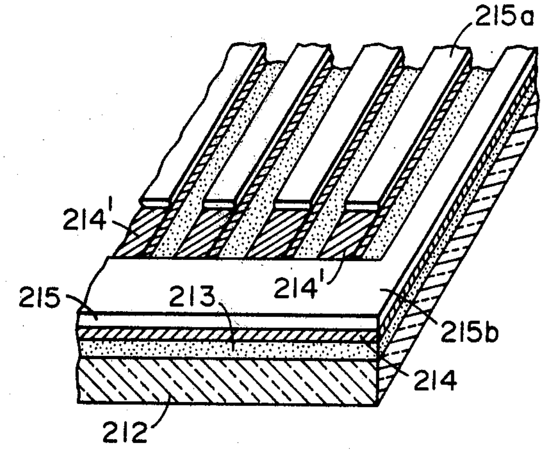
FIGS. 11A, 11B, 12 and 13 are schematic partial views of the recording head for explaining the steps of the method of the present invention.

A substrate with heat generating elements, as shown in a magnified perspective view in FIG. 11A, was prepared in the following manner.

Figure 11B:
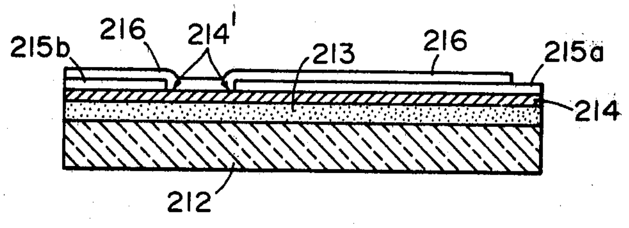

On an alumina substrate 212 there were formed, in succession, an $SiO_2$ heat accumulating layer 213 (several microns, a $ZrB_2$ heat-generating resistor layer 214 (800 A) and an aluminum electrode layer 215 (5000 A), and selective etching was conducted to form heating resistors 214' of 60 μm in width and 75 μm in length. Also selecting electrodes **215*a* and a common electrode 215*b* were formed by similar etching. Successively an $SiO_2$ protective layer 216 (0.01 μm) was formed on the electrode layer 215, as shown in FIG. 11B**.

On said protective layer 216, a heat-resistant resin as shown in Table 3 was coated in liquid state, dried in vacuum and baked under the conditions summarized also in Table 3 to obtain the substrate for Experimental Examples 1–9.

Figure 12:
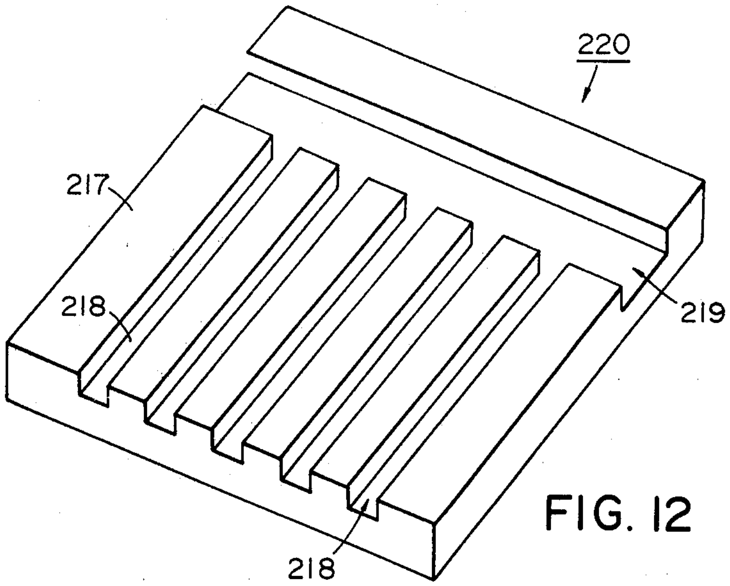

Separately a grooved plate 220 as shown in FIG. 12 was prepared by forming, on a glass plate 217, plural grooves 218 (70 μm in width and 60 μm in depth) and another groove 219 for constituting the common ink chamber by means of a microcutter.

Figure 13:
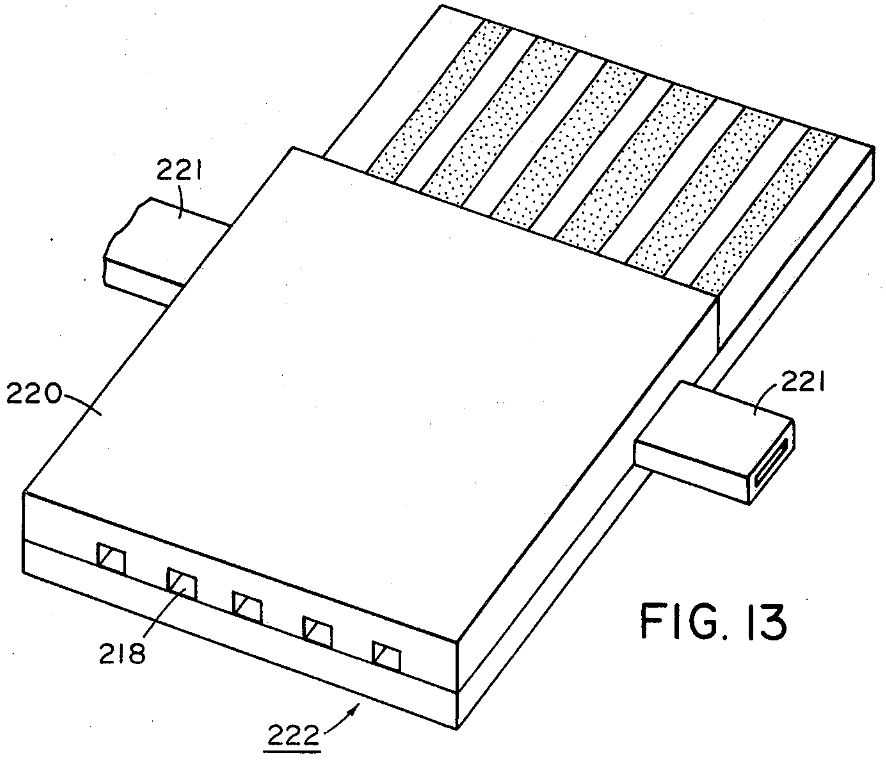

The above-mentioned substrate having heat generating elements and the grooved plate were mutually adhered after positioning of said heat generating elements with said grooves, and ink supply pipes 221 for ink supply from an unrepresented ink reservoir were mounted to complete the integral recording head block 222 as shown in FIG. 13.

Further said block 222 was connected to a lead board having electric connections to said selecting electrodes and common electrode.

The ink droplet ejection was experimented with drive pulses of:

pulse width: 10 μsec pulse frequency: 10 kHz

The ink composition was:

water: 70 parts by weight diethylene glycol: 29 parts by weight black dye: 1 part by weight In the droplet ejection tests conducted under the above-mentioned conditions, the head blocks showed excellent durability as summarized in Table 3, combined with satisfactory recording performance.

In these examples the durability was rated by the number of electric pulses repeatedly applicable to the head block in the following manner:

A: $\geqq 10^9$

B: $10^8$–$10^9$

C: $\leqq 10^5$

TABLE 3

| Ex. | Resin used | Trade name | Thickness (μm) | Forming condition (baking) | Durability rating |
|---|---|---|---|---|---|
| 1 | silicone resin | KS-700 (Shinetsu Chemical) | 1 | 250° C./1 hr | A |
| 2 | silicone | KS-701 (Shin- | 0.5 | 200° C./1 hr | A |

TABLE 3-continued

| Ex. | Resin used | Trade name | Thickness (μm) | Forming condition (baking) | Durability rating |
|---|---|---|---|---|---|
| | resin | etsu Chemical) | | | |
| 3 | silicone resin | KS-737 (Shin-etsu Chemical) | 0.1 | 200° C./40 min. | B |
| 4 | fluorinated resin | Daiflon D45S (polychlorotrifluoroethylene dispersion) (Daikin Co.) | 1 | 260° C./1 hr | A |
| 5 | fluorinated resin | Neoflon ND-3 (tetrafluoroethylene-hexafluoropropylene copolymer enamel) (Daikin Co.) | 1 | 200° C./1 hr | A |
| 6 | fluorinated resin | Neoflon ND-2 (tetrafluoroethylene-hexafluoropropylene copolymer enamel) (Daikin Co.) | 2 | 350° C./1 hr | A |
| 7 | epoxy resin | Epikote #1001 (Shell Chemical) dicyandiamide | 1 | 150° C./30 min. | A |
| 8 | epoxy resin | Epikote #1001 (Shell Chemical) p,p'-diaminodiphenyl methane | 0.3 | 165° C./4 hrs. | B |
| 9 | polyimide | Pyre ML (du Pont) | 1 | 300° C./1 hr | A |
| ref. | | none | — | — | C |

Note:
The reference example has $SiO_2$ protective layer (0.01 μm) with no additional treatment by heat-resistant resin.

EXPERIMENTAL EXAMPLES 10–23

The $SiO_2$ protective layer 216 in the foregoing examples 1–9 was replaced by the materials shown in Table 4 which were further covered with heat-resistant baked resins also shown in Table 4 to obtain substrates in a similar manner as in Experimental Examples 1–9.

The obtained recording blocks were tested in a similar manner, the rating of which was conducted in a similar manner also shown in Table 4.

TABLE 4

| Ex. | 1st layer | (thickness in μm) | 2nd layer | (thickness in μm) | Durability rating |
|---|---|---|---|---|---|
| 10 | beryllium oxide | (0.1) | polyimide | (0.5) | A |
| 11 | aluminum oxide | (0.5) | silicone resin | (0.5) | A |
| 12 | zirconium oxide | (0.08) | fluorinated resin | (1) | A |
| 13 | tantalum nitride | (0.05) | fluorinated resin | (1) | A |
| 14 | beryllium boride | (0.2) | silicone resin | (0.8) | B |
| 15 | lanthanum sulfide | (0.1) | BT resin | (0.8) | A |
| 16 | neodym sulfide | (0.8) | epoxy resin | (0.5) | A |
| 17 | silicone resin | (0.1) | epoxy resin | (0.5) | B |
| 18 | polyimide | (0.5) | p-vinylphenolic resin | (0.1) | A |
| 19 | epoxy resin | (0.1) | silicone resin | (1) | A |
| 20 | fluorinated resin | (0.3) | polyimide | (0.8) | B |
| 21 | polyimide | (0.5) | epoxy resin | (1) | A |
| 22 | BT resin | (0.08) | BT resin | (1) | A |
| 23 | p-vinylphenolic resin | (1) | polybenzimidazole | (0.1) | B |

Note:
silicone resin: KS-701
fluorinated resin: Neoflon ND-3
epoxy resin: Epikote #1001 + dicyandiamide
polyimide: Pyre ML

EXPERIMENTAL EXAMPLES 24–42

A substrate with heat generating elements, as shown in a magnified perspective view in FIG. 11A, was prepared in the following manner.

On an alumina substrate 212 there were formed, in succession, an $SiO_2$ heat accumulating layer 213 (5 μ), a $ZrB_2$ heat-generating resistor layer 214 (800 A) and an aluminum electrode layer 215 (5000 A), and selective etching was conducted to form heating resistors 214' of 40 μm in width and 200 μm in length. Also selecting electrodes 215*a* and a common electrode 215*b* were formed by similar etching. Successively a protective layer 216 as shown in Table 5 was formed on the electrodes 215*a*, 215*b*, and on the heating resistors 214'.

Separately a grooved plate 220 as shown in FIG. 12 was prepared by forming, on a glass plate 217, plural grooves 218 (40 μm in width and 40 μm in depth) and another groove 219 for constituting the common ink chamber by means of a microcutter.

The above-mentioned substrate having heating resistors and the grooved plate were mutually adhered after positioning of said heating resistors with said grooves, and ink supply pipes 221 for ink supply from an unrepresented ink reservoir were mounted to complete the integral recording head block 222 as shown in FIG. 13.

Further said block 222 was connected to a lead board having electric connections to said selecting electrodes and common electrode.

The ink droplet ejection was experimented with square drive pulses of 40 V with a pulse width of 10 μsec and pulse interval of 200 μsec. The composition of the ink used was:

water: 79 parts by weight
diethylene glycol: 29 parts by weight
black dye: 1 part by weight In the droplet ejection tests conducted under the above-mentioned conditions, the head blocks showed excellent durability as summarized in Table 5, combined with satisfactory recording performance.

In these examples the durability was rated by the number of electric pulses repeatedly applicable to the head block in the following manner:

A: $\geqq 10^9$
B: $10^8$–$10^9$
C: $\leqq 10^5$

TABLE 5

| Ex. | Protective layer | (thickness in μm) | Specific resistivity (Ωcm) | Durability rating |
|---|---|---|---|---|
| 24 | sputtered titanium oxide | (0.5) | $10^7$ | A |
| 25 | sputtered niobium oxide | (1.0) | $6 \times 10^5$ | B |
| 26 | sputtered molybdenum oxide | (1.2) | $5 \times 10^6$ | A |
| 27 | sputtered hafnium oxide | (0.5) | $10^7$ | A |
| 28 | sputtered mullite ($3Al_2O_3.2SiO_2$) | (0.8) | $\geqq 10^8$ | A |
| 29 | sputtered forsterite ($2MgO.SiO_2$) | (1.0) | $\geqq 10^{10}$ | A |
| 30 | sputtered zircon ($ZrO_2.SiO_2$) | (0.7) | $\sim 10^8$ | A |
| 31 | sputtered yttrium oxide | (1.3) | $10^9$ | A |
| 32 | sputtered strontium oxide | (0.2) | $10^6$ | B |
| 33 | aluminum nitride layer formed by reactive sputtering with aluminum target | (0.7) | $\geqq 10^7$ | A |
| 34 | sputtered boron nitride | (1.5) | $10^8$ | A |
| 35 | evaporated selenium | (0.8) | $5 \times 10^5$ | B |
| 36 | electron beam evaporation of 1:1 mixture of tantalum oxide and lanthanum oxide | (1.5) | $10^7$ | B |
| 37 | silicone resin (KS-700; Shinetsu Chemical) coating vacuum dried and baked at 250° C./1 hr. | (1.0) | $\geqq 10^8$ | A |
| 38 | silicone resin (KS-701; Shinetsu Chemical) baked 200° C./1 hr. | (1.0) | $\geqq 10^8$ | A |
| 39 | fluorinated resin Daiflon D45S (polychlorotrifluoroethylene dispersion; Daikin Co.) baked 260° C./1 hr. | (1.0) | $\geqq 10^8$ | A |
| 40 | fluorinated resin Neoflon ND-2 (tetrafluoroethylene-hexafluoro-propylene copolymer enamel; (Daikin Co.) baked 350° C./1 hr. | (1.5) | $\geqq 10^8$ | A |
| 41 | epoxy resin Epikote #1001 (Shell Chemical) and dicyandiamide based 150° C./30 min. | (0.3) | $\geqq 10^8$ | B |
| 42 | polyimide pyre ML (DuPont) baked 300° C./1 hr. | (1.0) | $\geqq 10^8$ | A |
| ref. 1 | none | | — | C |

The results of the foregoing experimental examples clearly indicate that the presence of a protective layer remarkably improves the durability of the recording head.

Figure 6:
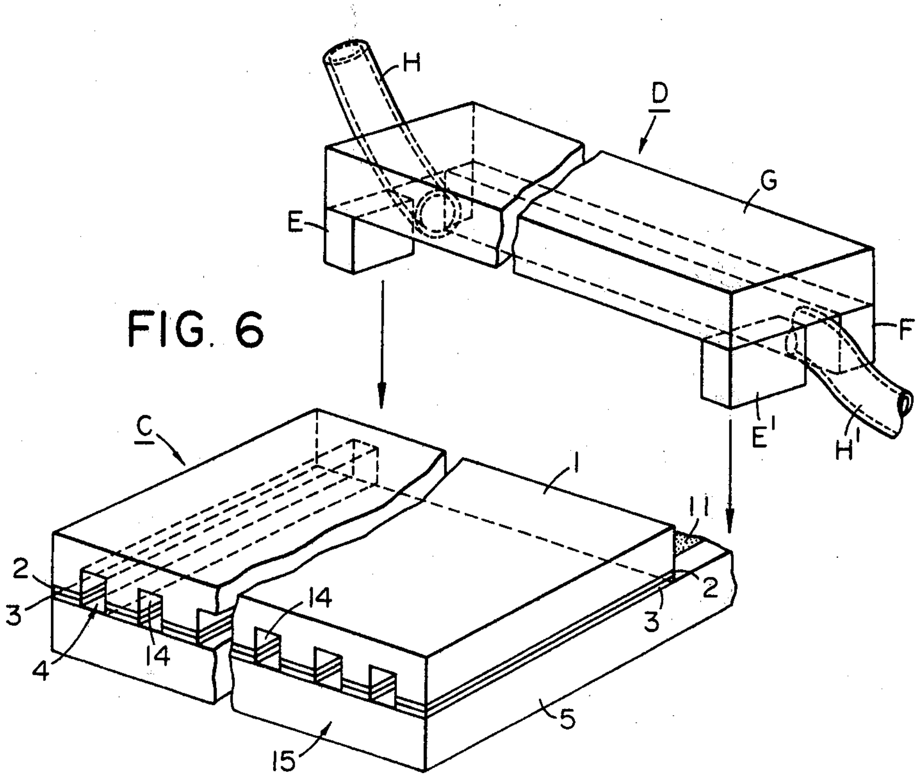

According to the present invention, the assembly of an intermediate chamber block D for ink supply as shown in FIG. 6 is conducted subsequent to the assembly of the action chamber block C shown in FIG. 5.

In this assembly, lateral parts E, E' are respectively coated with an adhesive of the following composition, then positioned with the action chamber block C as shown in FIG. 6 and heated for 1 minute at ca. 60° C. to bring the adhesive to a semi-cured state:

Adhesive:

Epikoke #828 (Shell Chemical) 100 pts. by wt.

Epomate B-002 (Ajinomoto Co.) 40 pts. by wt.

In this state a check step is conducted for confirming the absence of positional aberration or erroneous flow of adhesive to other parts. If the result is negative (case NO), the parts E, E' are separated from the block C and both are washed for reuse. In case of no defect (case YES) heating is conducted for 30 minutes at ca. 60° C. to cure the adhesive.

Subsequently a rear end part F is coated with the adhesive, positioned in a similar manner, and heated for 1 minute at ca. 60° C. to semi-cure the adhesive. A check step is conducted in a similar manner, and, in case of negative result (case NO) washing is conducted as explained above while in case of no defect (case YES) heating is conducted for 30 minutes at ca. 60° C. to cure the adhesive.

Then, a ceiling part G is coated with the adhesive, positioned in a similar manner, and heated for 1 minute at ca. 60° C. to semi-cure the adhesive. A check step is conducted in a similar manner, and, in case of negative result (case NO) washing is conducted as explained above while in case of no defect (case YES) heating is conducted for 30 minutes at ca. 60° C. and further for 10 minutes at ca. 100° C. to complete the curing of the adhesive.

Subsequently tubular parts H, H' are inserted into the determined positions of thus assembled block, and the gap therearound is filled with the adhesive. The assembly is let to stand for 30 minutes at room temperature as the curing in this case has to be conducted gradually. Thereafter a check step is conducted to confirm the absence of the flow of adhesive into the parts H, H' or into the intermediate chamber. If the result is negative (case NO) the parts are separated and washed for reuse as explained in the foregoing. In case of no defect (case YES) heating is conducted for 30 minutes at ca. 60° C. and further 10 minutes at 100° C. to obtain complete curing.

In this manner completed is the connection of the intermediate chamber block D to the rear portion of the action chamber block C. Then an end face 15 of the action chamber block C, on which the ejecting orifices are provided, is ground flat with grinding sand (#1000 or higher). After the grinding the assembly is washed to remove the grinding sand and other foreign matters that have entered the grooves 4 through the orifices 14 during the grinding. There is conducted a check step for confirming the complete planar state of the end face 15 and the complete cleaning of the grooves 4, and, if the grinding is incomplete, the grinding and washing steps are repeated. The check step is similarly conducted, and the foregoing step is repeated in case of negative result (case NO). In case of no defect (case YES) the assembly of the blocks C and D is dried. In the succeeding process a slit block I is attached to the end face 15 having said orifices.

Figure 7:
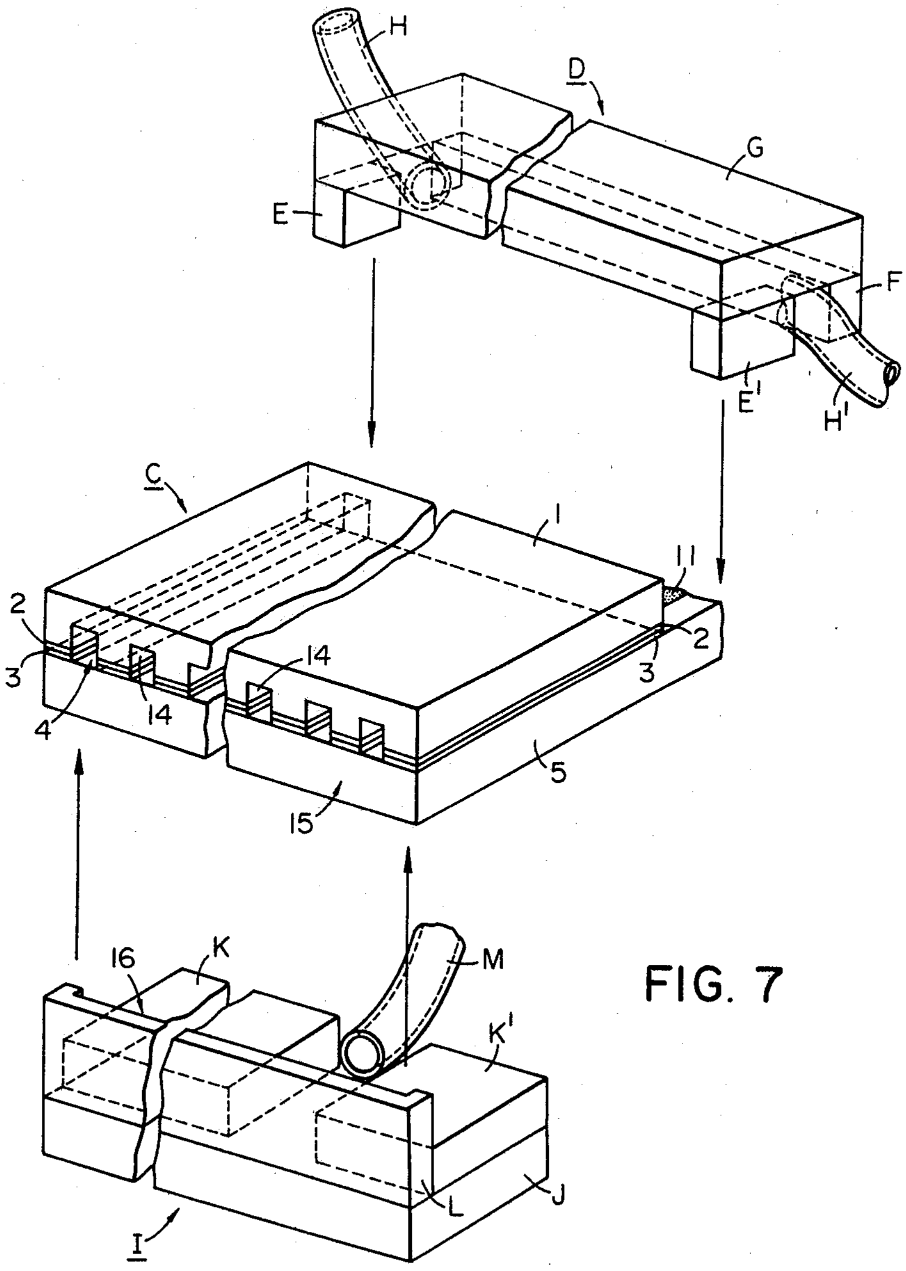

As shown in FIG. 7, said slit block I is composed of a bottom part J, lateral parts K, K' and front part L.

These parts are coated, in determined portions thereof, with the adhesive, then mutually positioned and heated for 1 minute at ca. 60° C. to bring the adhesive to the semi-cured state. A check step is conducted in this state to confirm correct assembling, and, the parts J, K, K' and L are separated and washed for reuse in case of the negative result (case NO). In case of no defect (case YES) heating is conducted for 30 minutes at ca. 60° C. and further 10 minutes at 100° C. to complete the curing of the adhesive.

Subsequently the blocks I and C are respectively coated with the adhesive, then mutually positioned as shown by the arrow in FIG. 7, and allowed to stand for 30 minutes at room temperature to attain the semi-cured state of the adhesive. Thereafter a check step is conducted to confirm the absence of adhesive flow into the orifices 14 or into the slits 16 of the block I. If the result is negative (case NO) the blocks are separated and washed for reuse as explained in the foregoing. In case of no defect (case YES) heating is conducted for 30 minutes at ca. 60° C. and further 10 minutes at 100° C. to complete the curing of the adhesive.

Subsequently a pipe M is inserted into the appropriate position, then the adhesive is filled into the gap therearound as in the foregoing case of the part H, and the assembly is let to stand for 30 minutes at room temperature. Thereafter a check step is conducted to confirm the absence of the adhesive flow, and, if the result is negative (case NO) the parts are separated and washed for reuse. In case of no defect (case YES) heating is conducted for 30 minutes at ca. 60° C. and further 10 minutes at 100° C. to completely cure the adhesive. In this manner a completed recording head is obtained.

Thus completed recording head is adhered to an aluminum plate, and the lead electrodes are connected to a flexible plated circuit.

Now there will be explained the example of ink jet recording with thus completed recording head illustrated in FIG. 7. Although FIG. 7 shows the different blocks of said recording head in exploded state, it will naturally be understood that these blocks are integrally adhered together before use in the recording.

At first a recording ink is introduced into each action chamber 4 through the parts H, H'. Upon receipt of a pulse voltage, the heating resistor (not shown) generates a thermal pulse to cause an instantaneous state change in said ink.

Said state change applies a force by a pressure wave to said ink, whereby said ink is ejected in a state of a droplet from the orifice 14 communicating with said liquid chamber 4, said droplet being deposited on an unrepresented recording member to perform recording. In such state, the ink leaking from the orifice 14 tends to flow down along the wall around the orifice 14, thus leading to the formation of an ink film in the vicinity of said orifice 14 and eventually hindering the droplet ejection. In the present embodiment this phenomenon is prevented by a slit 16 provided in the vicinity of the orifice 14, said slit being adapted to eliminate said ink film by suction. In this manner the size and speed of the ejected droplets are maintained in an extremely stable manner.

Although the foregoing explanation has been limited to an ink jet recording system utilizing thermal energy, the present invention is also applicable for example to another ink jet recording system in which the thermal action part is replaced by a mechanical vibrator such as a piezoelectric vibrating layer. Thus the recording head of the present invention is not limited to those shown in the illustrations. An example of the ink is a 2% dispersion of a black dye in a solvent principally composed of ethyl alcohol.

As detailedly explained in the foregoing, the present invention is advantageous in enabling to produce recording heads excellent in droplet ejection efficiency, power economization, stability of droplet ejection, uniformity of ejected droplets and response to the input signals, in allowing precise working in a easier procedure and in producing a high-density multi-orifice recording head in a simple and secure procedure. Particularly the recording head produced according to the present invention is capable of providing extremely stable ink droplets particularly in high-speed continuous emission.

What we claim is:

1. A method for producing a recording head for ejecting a recording liquid in an action chamber from an orifice connected with said action chamber in a state of small droplets and depositing at least a part of said droplets onto a recording surface to achieve recording, said method comprising a step X' for forming a member a' having a perforation for constituting said action chamber by forming a curable resin layer on a surface of a first sub-member, forming a groove on said surface bearing said resin layer and curing said resin layer while said surface bearing said resin layer is maintained in contact with a second sub-member thereby adjoining said sub-members, a step Y' of adjoining an end aperture of said perforation to another member b' constituting an intermediate supply chamber of said liquid, and a step Z' of attaching to member a' another member c' for forming an opening in the vicinity of the other end aperture of said perforation.

2. A method according to the claim 1, wherein each of said sub-members is plate-shaped member.

3. A method according to the claim 1, wherein said step X' comprises forming plural perforations in a substantially parallel manner in said member a'.

4. A method according to the claim 3, wherein each of said perforations is provided with a planar heating element.

5. A method according to the claim 1, wherein planar heating elements are provided on the surface of said second sub-member in said step X'.

6. A method for producing a recording head for ejecting a recording liquid in an action chamber from an orifice connected with said action chamber in a state of small droplets and depositing at least a part of said droplets onto a recording surface to achieve recording, said method comprising a step X' for forming a member a' having a perforation for constituting said action chamber by forming a curable resin layer on a surface of a first sub-member, forming a groove on said surface bearing said resin layer and curing said resin layer while said surface bearing said resin layer is maintained in contact with a second sub-member thereby bonding said sub-members, a step Y' of adjoining an end aperture of said perforation to another member b' constituting an intermediate supply chamber of said liquid.

7. A method according to the claim 6, wherein each of said sub-members is a plate-shaped member.

8. A method according to the claim 6, wherein said step X' comprises forming plural perforations in a substantially parallel manner in said member a'.

9. A method according to the claim 8, wherein each of said perforations is provided with a planar heating element.

10. A method according to the claim 6, wherein planar heating elements are provided on the surface of said second sub-member in said step X'.

11. A method for producing a recording head for ejecting a recording liquid in an action chamber from an orifice connected with said action chamber in a state of small droplets and depositing at least a part of said droplets onto a recording surface to achieve recording, said method comprising a step X' of adjoining plural members with a curable resin to form a determined structure, forming a curable resin layer on at least one of said members, bringing said resin layer to an intermediate state of the curing reaction, forming grooves on a face of said member bearing said resin layer, and curing said resin layer while it is maintained in contact with the other member thereby achieving adhesion of said members, and a step Y of adjoining an end aperture of said grooves to another member constituting an intermediate supply chamber of said liquid.

12. A method for producing a recording head for ejecting a recording liquid in an action chamber from an orifice connected with said action chamber in a state of small droplets and depositing at least a part of said droplets onto a recording surface to achieve recording, said method comprising a step X' for forming a member a' having a perforation for constituting said action chamber and an intermediate supply chamber of said liquid by forming a curable resin layer on a surface of a first sub-member, forming a groove on said surface bearing said resin layer and curing said resin layer while said surface bearing said resin layer is maintained in contact with a second sub-member thereby bonding said sub-members.

13. A method according to the claim 12, wherein each of said sub-members is a plate-shaped member.

14. A method according to the claim 12, wherein said step X' comprises forming plural perforations in a substantially parallel manner in said member a'.

15. A method according to the claim 14, wherein each of said perforations is provided with a planar heating element.

16. A method according to the claim 12, wherein planar heating elements are provided on the surface of said second sub-member in said step X'.

17. A method for producing a recording head for ejecting a recording liquid in an action chamber from an orifice connected with said action chamber in a state of small droplets and depositing at least a part of said droplets onto a recording surface to achieve recording, said method comprising a step X' of adjoining plural members with a curable resin to form a determined structure, forming a curable resin layer on at least one of said members, bringing said resin layer to an intermediate state of the curing reaction, forming grooves constituting said action chamber and an intermediate supply chamber of said liquid on a face of said member bearing said resin layer, and curing said resin layer while it is maintained in contact with the other member thereby achieving adhesion of said members.

* * * * *

UNITED STATES PATENT AND TRADEMARK OFFICE

CERTIFICATE OF CORRECTION

PATENT NO. : 4,392,907

DATED : July 12, 1983

INVENTOR(S) : YOSHIAKI SHIRATO, et al.

It is certified that error appears in the above-identified patent and that said Letters Patent is hereby corrected as shown below:

Change the inventor "Michiko Takahashi" to --Michiko Tanaka--.

Column 2, line 65, delete "After said";

line 66, before "adhesive" insert --After said--;

Column 2, line 66 through Column 3, line 4, do not indent the paragraph contained therein.

Column 3, line 26, change "A" to --Å--;

line 27, change "A" to --Å--.

Column 8, line 68, change "acrylonitirle" to --acrylonitrile--.

Column 9, line 5, change "trichlorobenzen" to --trichlorobenzene--.

Column 10, line 17, change "A" to --Å-- (both occurrences).

Column 12, line 8, change "A" to --Å--;

line 9, change "A" to --Å--;

UNITED STATES PATENT AND TRADEMARK OFFICE
CERTIFICATE OF CORRECTION

PATENT NO. : 4,392,907

DATED : July 12, 1983

INVENTOR(S) : YOSHIAKI SHIRATO, et al.

It is certified that error appears in the above-identified patent and that said Letters Patent is hereby corrected as shown below:

Column 12, line 34, change "79" to --70--.

Signed and Sealed this

*Eleventh* Day of *December 1984*

[SEAL]

*Attest:*

GERALD J. MOSSINGHOFF

*Attesting Officer* *Commissioner of Patents and Trademarks*